March 1, 1932. J. B. BURKS 1,847,427
PISTON RING
Filed Nov. 8, 1930

Inventor
James B. Burks

By Hardway Cathey
Attorneys

Patented Mar. 1, 1932

1,847,427

UNITED STATES PATENT OFFICE

JAMES B. BURKS, OF HOUSTON, TEXAS, ASSIGNOR OF ONE-HALF TO W. E. HOCHMUTH, OF HARRIS COUNTY, TEXAS

PISTON RING

Application filed November 8, 1930. Serial No. 494,324.

This invention relates to a novel piston ring.

One object of the invention is to provide a novel type of ring designed to form close fitting joints with the sides of the seat or groove wherein the ring is seated.

Another object of the invention is to provide, a ring for packing pistons, and other movable parts, formed of sections so shaped that the ring will, at all times, form close fitting joints with the sides of the ring seat and will present a smooth wearing face which will contact, throughout its area, with the wall of the cylinder or other part with which it co-acts.

With the above and other objects in view, this invention has particular relation to certain novel features of construction, operation, and arrangement of parts an example of which is given in this specification and illustrated in the accompanying drawings, wherein.

Figure 1:
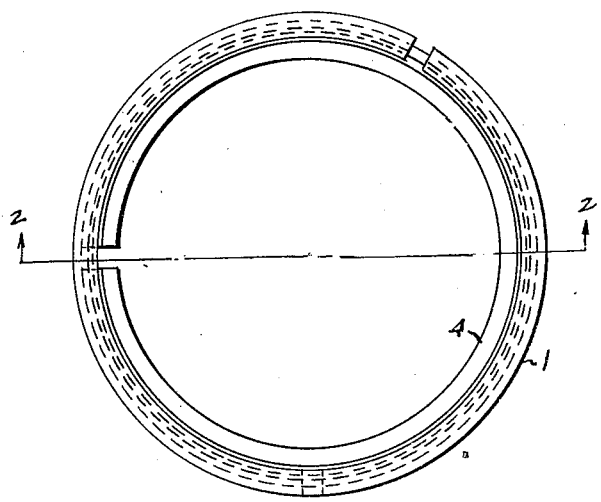
Figure 1 shows an end elevational view of the ring.
Figure 2:
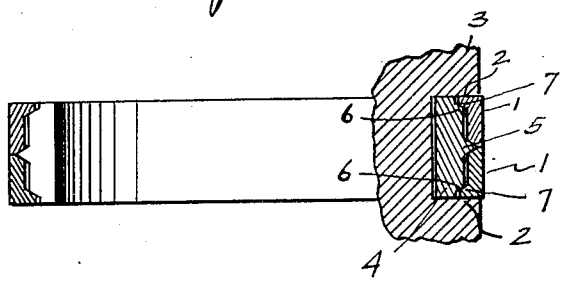
Figure 2 shows a cross sectional view taken on the line 2—2 of Figure 1.
Figure 3:
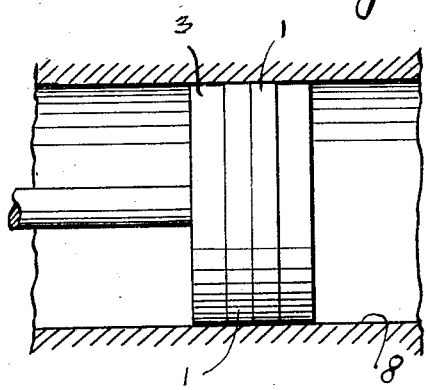
Figure 3 shows a side elevation of a piston showing the ring thereon.

Referring now more particularly to the drawings, wherein like numerals of reference designate similar parts in each of the figures, the numerals 1, 1 designate the two outer sections of the ring whose inner margins fit together and whose outer margins fit closely against the sides of the groove, or seat, 2 around the piston or plunger 3 and in which the ring is seated.

Within the outer sections 1 there is an annular, inner section 4, forming an expander, and having an annular, external, outwardly tapering rib 5 therein, whose apex works in between the outer sections 1 and constantly forces them apart and holds their outer margins closely against the sides of the ring seat 2.

Around the periphery of the inner ring, one at each side, are the outwardly tapering faces 6, 6 and the respective sections 1, 1 have the corresponding, inside, tapering faces 7, 7 which work against the corresponding faces 6. The contacting faces 6, 7 on each side have a pitch corresponding to the pitch of the corresponding side of the rib 5. The outward expansion of the inner, or expander, section 4, will expand the sections 1 and the inner and outer margins of the sections 1 will be similarly expanded by the rib 5 and by the contacting faces 6, 7 so that the wearing surface of the ring will contact, throughout its area, with the opposing cylinder wall 8 or other part with which the ring co-acts. Were it not for the contacting faces 6, 7 on each side the outward pressure of the rib 5 alone would cause the contacting margins of the ring sections 1 to be forced outwardly beyond the outer margins of said sections and in such case the entire outside area of the ring would not contact against the opposing cylinder wall.

The expander section 4 is preferably made somewhat thicker than the outer sections 1 of the ring so that the ring, as a whole, will have the required resiliency even though the outer sections may lose their resiliency due to heat, or wear.

The drawings and description disclose what I now consider to be the preferred form of the invention by way of illustration while the broad principle of the invention will be defined by the appended claims.

What I claim is:

1. A piston ring including a single ring section and a pair of adjacent ring sections around said single section, said single section having an annular, external tapering rib having an apex which fits into, but does not extend through, the joint between said adjacent sections, said single section and each section of said pair having annular, tapering, abutting faces adjacent the outer margins of the ring.

2. A piston ring adapted to seat in an annular groove around a piston and including a single, inner ring section, having outwardly tapering annular faces, one at each side, an outwardly tapering rib around said ring section, a pair of outer ring sections around the inner ring section, one on each side of said rib, said outer ring sections having annular inwardly diverging faces which fit against the corresponding sides of said rib and also having inside tapering faces which bear against the said outwardly tapering faces of said inner ring section, the corresponding sides of the outer and inner ring sections being flush so that said sides will contact closely against the side walls of said groove.

In testimony whereof I have signed my name to this specification.

JAMES B. BURKS.